(12) United States Patent  
Culbertson et al.

(10) Patent No.: US 12,190,666 B1  
(45) Date of Patent: Jan. 7, 2025

(54) USER IDENTIFICATION SYSTEM FOR OCCUPANTS OF A VEHICLE

(71) Applicant: United Services Automobile Association (USAA), San Antonio, TX (US)

(72) Inventors: William Preston Culbertson, Plant City, FL (US); Gregory David Hansen, Fuquay Varina, NC (US); Mark Anthony Lopez, Helotes, TX (US); Will Kerns Maney, New York City, NY (US); Keegan Patrick Hayes, Whitestown, IN (US); Steven Michael Bernstein, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 23 days.

(21) Appl. No.: 17/956,451

(22) Filed: Sep. 29, 2022

Related U.S. Application Data

(60) Provisional application No. 63/249,915, filed on Sep. 29, 2021.

(51) Int. Cl.
| | |
|---|---|
| *G07C 9/22* | (2020.01) |
| *E05F 15/73* | (2015.01) |
| *G06Q 40/08* | (2012.01) |
| *G07C 9/10* | (2020.01) |

(52) U.S. Cl.
CPC ............... *G07C 9/22* (2020.01); *G06Q 40/08* (2013.01); *G07C 9/10* (2020.01)

(58) Field of Classification Search
None
See application file for complete search history.

(56) References Cited

U.S. PATENT DOCUMENTS

| | | | |
|---|---|---|---|
| 9,193,314 B1 * | 11/2015 | Graham | B60W 50/0098 |
| 2005/0206741 A1 * | 9/2005 | Raber | H04N 5/907 |
| | | | 386/E5.067 |
| 2010/0332363 A1 * | 12/2010 | Duddle | G06Q 40/12 |
| | | | 705/41 |
| 2013/0018677 A1 * | 1/2013 | Chevrette | G06Q 40/08 |
| | | | 705/4 |
| 2014/0046701 A1 * | 2/2014 | Steinberg | B60W 40/10 |
| | | | 705/4 |
| 2019/0390504 A1 * | 12/2019 | Cheng | E05F 15/77 |
| 2020/0024884 A1 * | 1/2020 | Inskeep | G06T 7/70 |
| 2021/0168148 A1 * | 6/2021 | Boodaei | H04L 63/0861 |

* cited by examiner

*Primary Examiner* — John F Mortell
(74) *Attorney, Agent, or Firm* — Fletcher Yoder, P.C.

(57) ABSTRACT

A user identification system includes one or more processors configured to receive a first indication of a vehicle identity of a vehicle at an entrance of a location and retrieve a user profile associated with the vehicle identity from a user profile database. The user profile includes one or more user identities of one or more users authorized to enter the location. The one or more processors are configured to receive a second indication of a current user identity of a current user positioned in the vehicle, determine that the current user identity corresponds to a particular user identity of the one or more user identities, and output a control signal indicative of instructions to enable access to the location in response to the current user identity corresponding to the particular user identity.

20 Claims, 8 Drawing Sheets

USER IDENTIFICATION SYSTEM FOR OCCUPANTS OF A VEHICLE

CROSS-REFERENCE TO RELATED APPLICATION

This application claims priority to and the benefit of U.S. Provisional Application No. 63/249,915, entitled "USER IDENTIFICATION SYSTEM," filed Sep. 29, 2021, which is hereby incorporated by reference in its entirety for all purposes.

BACKGROUND

The present disclosure relates generally to user identification systems and methods.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Entry into a location, such as a person's residence or business, may be achieved by the person unlocking a door and walking into the location or by the person opening a garage door and driving a vehicle into a garage of the location. In some cases, another person may attempt to enter the location by obtaining a device that opens the garage door, such as another person that is not authorized to enter the location. Additionally, a driver of a vehicle may not be authorized to operate the vehicle. For example, the driver may not own the vehicle or may not be covered by an insurance policy associated with the vehicle. The unauthorized driver may operate the vehicle during certain events, such as while entering the location, during a traffic stop, during a traffic accident, and while driving on a roadway.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a user identification system includes one or more processors configured to receive a first indication of a vehicle identity of a vehicle at an entrance of a location and retrieve a user profile associated with the vehicle identity from a user profile database. The user profile includes one or more user identities of one or more users authorized to enter the location. The one or more processors are configured to receive a second indication of a current user identity of a current user positioned in the vehicle, determine that the current user identity corresponds to a particular user identity of the one or more user identities, and output a control signal indicative of instructions to enable access to the location in response to the current user identity corresponding to the particular user identity.

In certain embodiments, a user identification system includes one or more processors configured to receive an indication of an event associated with a vehicle, wherein a driver is positioned in the vehicle during the event. The one or more processors are configured to receive a plurality of indications of an identity of the driver of the vehicle, determine the identity of the driver and a confidence score associated with the identity based on the plurality of indications of the identity, and output a control signal indicative of instructions to display the identity of the driver and the confidence score associated with the identity.

In certain embodiments, a non-transitory computer-readable medium comprising computer readable instructions, that when executed by one or more processors, causes the one or more processors to perform operations including receiving a first indication of a vehicle identity of a vehicle at an entrance of a location and retrieving a user profile associated with the vehicle identity from a user profile database. The user profile includes one or more user identities of one or more users authorized to enter the location. The operations also include receiving a second indication of a current user identity of a current user positioned in the vehicle, determining that the current user identity corresponds to a particular user identity of the one or more user identities, and outputting a control signal indicative of instructions to enable access to the location in response to the current user identity corresponding to the particular user identity.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
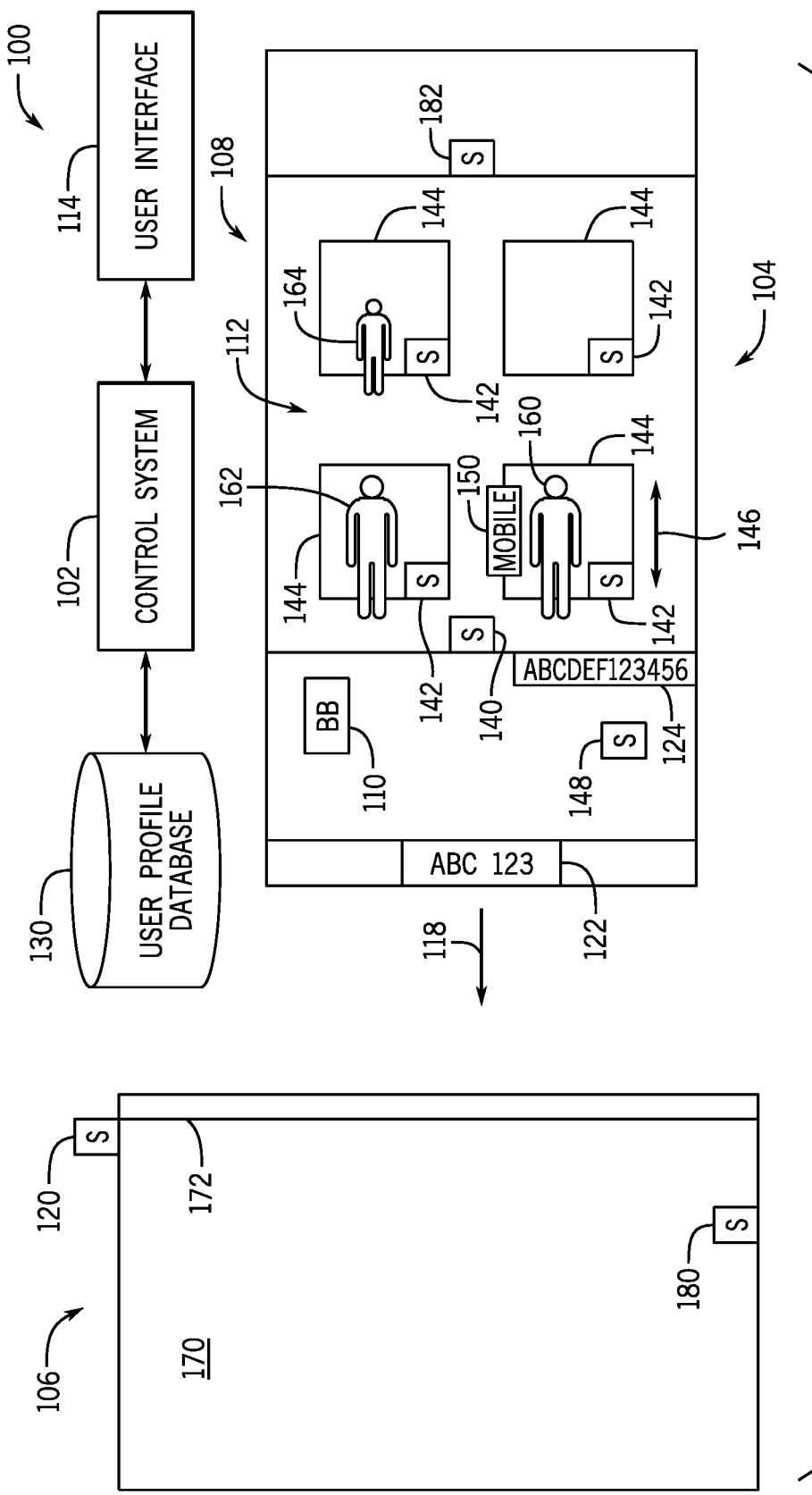
FIG. 1 illustrates a schematic diagram of a user identification system including a control system configured to identify a driver of a vehicle and enable the vehicle to access a location, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to a user identification system that identifies a vehicle and/or a user (e.g., a driver, a passenger) in the vehicle. More specifically, the user identification system may enable or block access to a location based on the vehicle's identity and/or the user's identity. For example, if the user is authorized to enter the location (e.g., a residence, a business), the user identification system may enable the vehicle to access the location, such as by opening a garage door or another access point of the location (e.g., a gate, a barrier). If the user is not authorized to the access the location, the user identification system may block the vehicle from accessing the location, such as by not opening the garage door or the other access point. In certain embodiments, the user identification system may determine whether the vehicle is authorized to access the location (e.g., in addition to or in place of determining whether the user is authorized to access the location). Accordingly, the user identification system may authenticate the vehicle and/or the user prior to the vehicle entering the location, thereby providing a secure environment at the location.

Additionally, the user identification system may identify a driver of the vehicle based on indications of the driver's identity. Examples of indications of the driver's identity may include an image of the driver, audio data of the driver's voice and/or other noises made by the driver, a seat position of the driver's seat and/or other seats in the vehicle, a weight of the driver (e.g., as detected by a sensor disposed at the driver's seat), and/or other suitable indications of the driver's identity. Each of the indications of the driver's identity may indicate one or more identities of the driver (e.g., one or more potential people driving the vehicle). The user identification system may determine a confidence score associated with each identity and display the identities and confidence scores, thereby providing an indication of a likely driver of the vehicle.

In certain embodiments, the driver may be operating the vehicle during an event, such as while attempting to access the location, during a traffic stop, during a traffic accident, or during another event related to the vehicle. The user identification system may determine the identity of the person driving the vehicle during the event, which may facilitate enabling access to the location. Additionally, the identification of the person may facilitate processing insurance claims associated with the event, such as a claim for damage to the vehicle sustained during a traffic accident. For example, in response to determining that the driver is authorized to operate the vehicle under a corresponding insurance policy, the user identification system may determine that the insurance claim is appropriate and should be processed.

In certain embodiments, the user identification system may include sensors disposed at the vehicle and/or at the location. For example, the sensors at the vehicle may include a camera configured to capture images and/or video of the driver, passengers, an interior of the vehicle, an exterior of the vehicle, and/or the vehicle's surroundings (e.g., other vehicles, structures, a roadway, an environment near the vehicle). Additionally, the sensors at the vehicle may include weight sensors disposed in seats of the vehicle and configured to weigh the driver and/or the passengers, seat sensors configured to detect configurations of seats in the vehicle (e.g., seat positions, seat back firmness, leg room), pedal sensors configured to detect positions of pedals (e.g., accelerator, brake) in the vehicle, an audio recording device (e.g., an audio recorder) configured to record audio generated by the driver and/or the passengers, a biometric sensor configured to collect biometric data (e.g., fingerprints, eye patterns, facial patterns, hair samples, blood samples) of the driver and/or the passengers, and/or other suitable sensors. In some embodiments, the sensors may be disposed at a secondary device. For example, the driver's cell phone may include a sensor configured to detect the driver's fingerprint. The sensors may include a position sensor of the cell phone (e.g., a global positioning system [GPS]), such that the user identification system may determine that the driver is in the vehicle based on the cell phone being positioned at the vehicle and the fingerprint sensor detecting the driver's fingerprint.

In certain embodiments, the user identification system may enable a user to select certain variables for monitoring by the sensors. For example, the user identification system may generate and/or provide a user interface configured to display selectable options of variables that may be monitored by the user identification system based on sensor data provided by the sensors. Examples of such monitor variables may include vehicle speed, braking usage, data indicative of distracted driving (e.g., cell phone usage, car electronic usage), a time of day that the vehicle is driven (e.g., nighttime, daytime), an extent of a time period during which the vehicle is driven, parking locations of the vehicle (e.g., in a garage, in a driveway, on a street, in a particular neighborhood), and other suitable monitor variables. In response to the user selecting certain monitor variables, the user identification system may monitor the variables and provide incentives (e.g., rewards) for the user following recommendations related to the variables or otherwise improving the variables. By way of a specific example, if the user selects vehicle speed, the user identification system may determine that the user drives at excessive speeds on a freeway during the user's morning commute and may recommend that the user decrease their average speed on the freeway. Additionally, the user identification system may offer an incentive of a reduced insurance cost (e.g., insurance premium, insurance deductible) for reducing the average vehicle speed. Thereafter, the user identification system may monitor the vehicle speed and determine whether the user has followed the recommendation. In some embodiments, the sensors may include a black box of the vehicle configured to collect data corresponding the monitor variables, such as the vehicle speed.

With the foregoing in mind, FIG. 1 illustrates a schematic diagram of a user identification system 100 including a control system 102 (e.g., an electronic controller) that may receive sensor data from sensors 104. As illustrated, the sensors 104 are disposed at a location 106 and at a vehicle 108. The location 106 may include a residence (e.g., a house, an apartment building, a rental property, a hotel), a business, or another suitable structure. In certain embodiments, the sensors 104 may be disposed only at the location 106 or only at the vehicle 108. To facilitate discussion and image clarity, the sensors 104 are identified as a group with one arrow in FIG. 1, while individual sensors are also labeled with "S" in FIG. 1. Additionally, some sensors 104 include additional reference numbers, and in certain embodiments, the sensors 104 may include a black box 110 disposed at the vehicle 108. The sensors 104 may provide sensor data indicative of a vehicle identity of the vehicle 108, user identities of users 112 disposed in the vehicle 108, conditions at the location 106 (e.g., environmental conditions), operation and/or usage of the vehicle 108, and/or other suitable information.

The control system 102 may receive the sensor data from the sensors 104 and enable or block access to the location 106 based on the sensor data. For example, the sensor data may indicate a vehicle identity of the vehicle 108 and/or user identities of one or more of the users 112, and the control system 102 may enable the vehicle 108 to access the location 106 in response to the vehicle identity matching (e.g., corresponding to) a vehicle that is authorized to access the location 106 and/or in response to a particular user identity (e.g., a user identifier, a unique user identifier) matching (e.g., corresponding to) a user that is authorized to access the location 106. Accordingly, the user identification system 100, via the control system 102, may provide a secure environment at the location 106 by blocking unauthorized vehicles and/or unauthorized users from accessing the location 106.

Additionally, the control system 102 may determine an identity of a user driving the vehicle 108 (e.g., a driver) based on the sensor data received from the sensors 104, such as a current driver or a user that drove the vehicle during an event. For example, the control system 102 may receive the sensor data from multiple, different sensors 104 and/or from one sensor 104 at different times (e.g., multiple data points captured by the one sensor 104 at different times). As such, the sensors 104 may provide multiple indications of the driver's identity. As described in greater detail below, the sensor data indicative of the driver's identity may include an image of the driver, a video of the driver, audio data of the driver's voice and/or other noises made by the driver, a seat position of the driver's seat and/or other seats in the vehicle, a weight of the driver (e.g., as detected by a sensor disposed at the driver's seat), and/or other suitable indications of the driver's identity. The control system 102 may determine the driver's identity based on the sensor data and a confidence score associated with the driver's identity. For example, the control system 102 may determine that the driver is likely a particular person based on an image of the driver matching (e.g., corresponding to) an image of the particular person and a seat position of the driver's seat matching (e.g., corresponding to) a preferred seat position of the particular person.

The confidence score may be a percentage value, such as a range from 0 percent to 100 percent, where 0 percent indicates the driver is not the particular person, and 100 percent indicates that the driver is the particular person. In certain embodiments, the confidence score may be another value or measured on another scale, such as a value/scale ranging from 0 to 1, 0 to 10, 0 to 100, or another suitable range. In some embodiments, the control system 102 may determine whether the driver is a particular person among multiple potential people and assign a confidence score to each person. For example, the control system 102 may determine that the driver is a first person with a confidence score of 85 percent and that the driver is a second person with a confidence score of 10 percent.

The control system 102 may output a control signal indicative of instructions to display the identity of the driver and confidence score. For example, the control system 102 may output the control signal to a user interface 114 of a device of a user. The control system 102 may generate a representation of a graphical user interface (GUI) (e.g., a notification for presentation via the GUI) indicating the identity and the confidence score and provide the representation (e.g., transmit signal) to the device for presentation via the user interface 114. In some embodiments, the control system 102 may output a control signal to the device with instructions to generate the representation of the GUI. An example of the representation is described below in reference to FIG. 4. In some embodiments, the user identification system 100 may include the user interface 114 and/or the device of the user having the user interface 114. The user device may be a computer (e.g., desktop computer, phone, laptop, tablet) disposed at the location 106, at the vehicle 108, or at a remote location relative to the location 106 and the vehicle 108. The user of the device may be the driver of the vehicle 108, a passenger of the vehicle 108, or another interested person (e.g., a person authorized to drive the vehicle 108, a person covered by an insurance policy associated with the vehicle 108, a representative of a company that provides the insurance policy).

In certain embodiments, the control system 102 may receive an indication that the vehicle 108 is attempting to enter the location 106. For example, while the vehicle 108 is disposed adjacent to the location 106 (e.g., in a driveway, on a street) and/or while the vehicle 108 is approaching the location 106 (as indicated by arrow 118), a sensor 120 of the sensors 104 may detect the vehicle 108 (e.g., the presence of the vehicle 108, the location of the vehicle 108) and obtain data indicative of the vehicle identity of the vehicle 108. More specifically, the sensor 120 may include a camera configured capture images and/or video of the vehicle 108, a license plate 122 of the vehicle 108, a vehicle identification number 124 (VIN) of the vehicle 108, and/or other identifying attributes of the vehicle 108. In some embodiments, the vehicle 108 may carry another identifier and/or encode identifiers in other types of sensor data. For example, the vehicle 108 may carry a radio-frequency identification (RFID) that is detectable by a RFID reader coupled to the control system 102. The control system 102 may carry out steps to identify the vehicle 108 in response to the vehicle 108 being detected at an entrance of the location 106 (e.g., being at or near the entrance, such as being within a threshold distance of the entrance) and/or receipt of an input provided via a keypad at the entrance of the location 106. In certain embodiments, the sensors 104 may include the RFID reader.

The control system 102 may determine the vehicle identity of the vehicle 108 based on the sensor data received from the sensor 120 (e.g., via text recognition and/or via image recognition techniques, such as template matching) and may retrieve a user profile associated with the vehicle identity from a user profile database 130. The user profile may indicate an insurance policy associate with the vehicle identity, users authorized to operate the vehicle 108 (e.g., authorized under the insurance policy, authorized by an owner of the vehicle 108), users authorized to access the location 106 (e.g., authorized by an owner and/or resident of a home or business at the location 106), and other information relevant to the location 106, the vehicle 108, and/or the users 112. The user profile database 130 may include multiple user profiles with each user profile associated with a particular user, a particular vehicle, a particular location, and/or a particular insurance policy. The particular insurance policy may include an insurance policy associated with the location 106, such as a homeowner's insurance policy, and/or an insurance policy associated with the vehicle 108, such as an automobile insurance policy. In certain embodiments, the user identification system 100 may include the user profile database 130 and/or a memory device storing the user profile database 130.

Additionally, the control system 102 may receive sensor data from the sensors 104 indicative of one or more user identities (e.g., current user identities) of the users 112 (e.g., current users). For example, the sensors 104 may include a sensor 140 disposed in the vehicle and configured to capture images, video, and/or audio of the users 112 (e.g., voices of the users 112, noises made by the users 112). In certain embodiments, the sensors may include sensors 142 disposed at seats 144 of the vehicle 108 and configured to weigh the users 112 and/or to detect configurations of the seats 144. The configurations of the seats 144 may include a relative forward or backward position, as indicated by arrows 146, a position of a seat back, a seat firmness, a seat height, and/or another relative position of the seat 144 or a portion of the seat 144. In some embodiments, the sensors 104 may include a sensor 148 disposed at the vehicle and configured to detect positions of driving components of the vehicle 108, such as positions of pedals of the vehicle 108, including relative positions of an accelerator pedal, a brake pedal, a clutch pedal, and/or an emergency brake pedal. In certain embodiments, the sensors 104 may include sensors disposed at a secondary device of a user, such as a mobile device 150 (e.g., cell phone, tablet) of the user. The sensors of the mobile device 150 may include a fingerprint scanner or other biometric scanner, a positioning system (e.g., GPS), and other suitable sensors.

In certain embodiments, the control system 102 may control one or more of the sensors 104, such as by directly controlling the sensors 104 or by controlling communication with the sensors 104. For example, the control system 102 may output a control signal to one or more of the sensors 104 indicative of instructions to collect sensor data indicative of the users identities and/or to send the sensor data to the control system 102 in response to receiving an indication of the vehicle identity of the vehicle 108 and/or in response to receiving an indication that the vehicle 108 is approaching the location 106 (e.g., within a threshold distance, such as within range of the sensor 120 or as determined by the control system 102 based on coordinates from a positioning system of the vehicle 108 or the positioning system of the mobile device 150 in the vehicle 108). In certain embodiments, the control system 102 may output a control signal to one or more of the sensors 104 indicative of instructions to collect sensor data indicative of the vehicle identity of the vehicle 108 in response to receiving the indication that the vehicle 108 is approaching the location 106 (e.g., at an entrance of the location 106 and/or within a threshold distance of the location 106).

In certain embodiments, the control system 102 may turn the sensors 104 on and off (e.g., control power supplied to the sensors 104) and/or control a sampling rate of the sensors 104. For example, the control system 102 may turn one or more of the sensors 104 on or off and/or control (e.g., increase, decrease) the sampling rate of the sensors 104 in response to a particular event, such as receiving an indication that one of the users 112 is positioned in or adjacent to the vehicle 108 (e.g., receiving an indication from one of the sensors 104), receiving an indication that the vehicle 108 was involved in a traffic accident, receiving an indication that one or more of the sensors 104 has malfunctioned and/or is providing inconsistent data to the control system 102, and/or other suitable factors. The adjusted sampling rate may cause the control system 102 to receive data from one or more of the sensors 104 at the adjusted sampling rate. Accordingly, the control system 102 may improve an efficiency associated with operation of the sensors 104, as well as the user identification system 100 generally, such as by controlling power consumed by the sensors 104 and controlling data obtained and transmitted by the sensors 104.

The control system 102 may determine user identities of the users 112 based on the sensor data received from the sensors 104 (e.g., from the sensor 140, the sensors 142, the sensor 148, the sensors of the mobile device 150). As illustrated, the users 112 include a driver 160, a first passenger 162, and a second passenger 164. The control system 102 may determine a user identity of the driver 160, the first passenger 162, and/or the second passenger 164. Additionally, the control system 102 may determine the user identities based on sensor data from a single sensor 104, such an image captured by the sensor 140, or based on sensor data from multiple sensors 104, such the image captured by the sensor 140 and the weight of each user 112. The control system 102 may access the user profile database 130 and compare the sensor data to the user profiles in the user profile database 130 to determine the user identities (e.g., based on a closest match).

In certain embodiments, the control system 102 may determine a confidence score associated with the user identity of one or more of the users 112. As described above, the confidence score may indicative a likelihood that a user 112 is a particular known person. By way of example, the sensor 140 may capture an image of the driver 160 and the first passenger 162 and provide the image (e.g., an indication of the user identities of the driver 160 and the first passenger 162) to the control system 102. Based on the indication of the user identities, the control system 102 may determine that the driver 160 is a particular first person with a confidence score of 65 percent and that the first passenger 162 is a particular second person with a confidence score of 60 percent. The control system 102 may receive additional sensor data from the sensors 142 disposed at the seat 144 of the driver 160 and at the seat 144 of the first passenger 162 indicative of weights of the driver 160 and the first passenger 162 and indicative of relative positions of the seats 144. Based on the additional sensor data, the control system 102 may determine that the driver 160 is the particular first person with a confidence score of 50 percent and that the first passenger 162 is a particular second person with a confidence score of 95 percent. For example, the weight and/or relative seat position may indicate that the first passenger is likely the second particular person and that the driver is likely not the first particular person. In certain embodiments, the control system 102 may consider other portions of the sensor data described herein to determine the user identities, such as in addition to or in place of the image data, the weight data, and/or the relative seat position data. In some embodiments, the control system 102 may determine a user identity for one or more of the users 112 without determining the confidence score.

After determining the user identities and/or confidence scores, the control system 102 may determine whether one or more of the user identities match (e.g., corresponding to) a user identity of a user authorized to the access the location. For example, the control system 102 may determine whether a name or other identifying information associated with a determined user identity of a user 112 matches a name or other identifying information associated with the user profile retrieved from the user profile database 130 that is associated with a user authorized to access the location. As described in reference to FIG. 3, the control system 102 may generate and/or provide instructions to generate a representation of a GUI (e.g., a notification for presentation via the GUI) that enables a user to view lists of authorized vehicles and authorized users and/or to add vehicle and users to the lists.

In certain embodiments, the user profile may include a user identity (e.g., a sub-profile) for each user that is authorized to access the location 106 and/or that is authorized to drive the vehicle 108. Each user identity of the user profile may include identifying information that may be used by the control system 102 to uniquely identify the users 112. For example, each user identity may include an image of the corresponding authorized user, audio data (e.g., voice data, noises) of the authorized user, preferred seat positions (e.g., seat configurations) of the authorized user, preferred pedal positions of the authorized user, a weight (e.g., a recent weight, an average weight) of the authorized user, a height (e.g., a recent height, an average height) of the authorized user, a name, an address, and/or other suitable information that may be used by the control system 102 to uniquely identity the authorized users.

The control system 102 may compare the sensor data received from the sensors 104 (e.g., the indications of the user identities of the users 112) to the identifying information of the user profile to determine whether one or more of the indications of the user identities match (e.g., correspond to) a user identity of the user profile. For example, the control system 102 may determine whether an image of the driver 160 matches an image of a user identity of an authorized user of the user profile. In another example, the control system 102 may determine whether a weight and/or a seat configuration of the passenger 162 matches a weight and/or a preferred seat configuration of a user identity of an authorized user of the user profile. The control system 102 may collect and/or process the sensor data in a particular order or sequence, as well as limit the sensor data for efficient processing and operations. For example, the control system 102 may first obtain primary sensor data, such as the image captured by the sensor 140. If the image provides sufficient information (e.g., is clear; facial features are captured) to indicate the user identity for the one or more users 112 with sufficient confidence (e.g., a threshold confidence score), the control system 102 may check whether the user identify matches a user authorized to access the location 106 and may not collect and/or process other types of sensor data (e.g., weight, audio, seat configurations, driving component positions, from the mobile device). Or if the image provides sufficient information to indicate the user identity for the one or more users 112 with sufficient confidence, and if the user identify matches a user authorized to access the location 106, the control system 102 may not collect and/or process other types of sensor data. However, if (e.g., only if) the image does not provide sufficient information to indicate the user identity for the one or more users 112 with sufficient confidence and/or if (e.g., only if) the user identity does not match a user authorized to access the location 106, then the control system 102 may obtain secondary sensor data, such as the audio. The control system 102 may step through the various types of sensor data one by one in this manner. It should be appreciated that the control system 102 may set the primary sensor data, the secondary sensor data, and so forth to be any of the sensor data (e.g., the primary sensor data is audio, and the secondary sensor data is the image).

In response to the control system 102 determining that one of the users 112 is authorized to access the location 106, the control system 102 may enable the vehicle 108 to access the location 106. As illustrated, the location 106 includes a garage 170 with a garage door 172. Accordingly, the control system 102 may output a control signal to the garage door 172 (e.g., a controller or system configured to open and/or close the garage door 172) indicative of instructions to open the garage door 172 in response to determining that one of the users 112 is authorized to access the location 106, thereby enabling the vehicle 108 to drive into the garage 170 and access the location 106. In certain embodiments, the location 106 may include other access points configured for control by the control system 102, such a gate or another barrier that may be opened and/or closed by the control system 102.

In certain embodiments, the control system 102 may require that a particular user 112, such as the driver 160, the first passenger 162, the second passenger 164, and/or another user in the vehicle 108, be authorized to access the location 106 to enable the vehicle to access to the location 106. In some embodiments, the control system 102 may require that multiple users 112 (e.g., 2, 3, 4, 5, 6) or that all of the users 112 be authorized to access the location 106 to enable the vehicle to access to the location 106.

In certain embodiments, the control system 102 may compare the confidence score of the user identities of the users 112 to a threshold confidence score to enable access. For example, in response to one or more of the user identities exceeding the threshold confidence score, the control system 102 may enable the vehicle 108 to access the location 106. In response to some or all of the user identities not exceeding the threshold confidence score, the control system 102 may block the vehicle 108 from accessing the location 106. The control system 102 may determine the threshold confidence score based on a user input (e.g., an input provided by a user, owner, and/or occupant of the location 106), a type of the vehicle (e.g., make, model, year), a number of the users 112 in the vehicle 108, and/or other suitable factors.

The control system 102 may block access to the location 106 by not opening the garage door 172 and/or the other access point. Additionally, the control system 102 initiate other measures configured to further block the vehicle 108 and/or the users 112 from accessing the location 106, such as closing and/or locking an additional door (e.g., a reinforced barrier) at the garage 170, locking the garage door 172, closing and/or locking other access points of the location 106 (e.g., other doors, a basement access point, windows), notifying emergency personnel (e.g., police, paramedics, firemen), notifying an interested party (e.g., a user, owner, and/or occupant of the location 106), and/or other suitable measures.

As illustrated, the sensors 104 include a sensor 180 disposed at the location 106 (e.g., in the garage 170 of the location 106). The sensor 180 may detect environmental conditions at the location 106, which may include a temperature, a humidity, a presence of gases (e.g., natural gas) and/or odors, and/or other environmental conditions. The control system 102 may receive sensor data from the sensor 180 and enable and/or block access to the location 106 based on the sensor data. For example, based on an indication that there is natural gas in the garage 170, the control system 102 may block access to the garage 170. Additionally, the control system 102 may notify emergency personnel of the indication of natural gas. In another example, if the environmental conditions indicate comfortable conditions for the users 112 (e.g., a comfortable temperature, a comfortable humidity), the control system 102 may enable access to the garage 170, such as in addition to verifying that the vehicle 108 and/or the users 112 are authorized to access the garage 170.

In certain embodiments, the control system 102 may determine an adjustment to an insurance cost (e.g., insurance premium, insurance deductible) associated with installation and/or usage of the user identification system 100. For example, the control system 102 may provide a notification or another indication indicative of an offer to install the sensors 104 at the location 106 and/or at the vehicle 108 and/or to collect data via the sensors 104. The notification may indicate that, if a user (e.g., a user/owner/occupant of the location 106, a user/owner/occupant of the vehicle 108) installs or approves use of the sensors 104, an insurance cost associated with the location 106 (e.g., homeowner's insurance, renter's insurance) and/or an insurance cost associated with the vehicle 108 may decrease. In response to receiving approval from the user of the installation and/or use of the sensors 104, the control system 102 may determine the corresponding decrease and store an indication of the decrease, such as at the user profile associated with the user in the user profile database 130.

As described above, the control system 102 may determine a user identity of a driver, such as the driver 160, of the vehicle 108. More specifically, the control system 102 may determine who is or was driving the vehicle 108 during a particular event, such as while attempting to access the location 106, during a traffic accident, during a traffic stop, and/or during other suitable events. For example, the control system 102 may receive an indication of the event from the sensors 104 and/or may receive a user input indicative of occurrence of the event. For instances when the event is a traffic accident, the control system 102 may receive the indication of the event from a collision sensor of the sensors 104 disposed at the vehicle 108.

Additionally, as described above, the control system 102 may determine the identity of the driver based on the indications received from the sensors 104. The indications of the driver's identity may be different from one another and may include an image of the driver, audio data of the driver's voice and/or other noises made by the driver, a seat position of the driver's seat and/or other seats in the vehicle, positions of pedals of the vehicle, a weight of the driver (e.g., as detected by a sensor disposed at the driver's seat), and/or other suitable indications of the driver's identity. In certain embodiments, the control system 102 may determine the confidence score associated with the driver's identity. For example, multiple, different indications of the driver's identity may indicate that the driver is a particular person, and the confidence score may indicate a likelihood that the driver is the particular person. In some embodiments, the indications may indicate that the driver could be different people, and the control system 102 may determine a confidence score for each of the different people.

After determining the identity of the driver and the confidence score, or the multiple identities and corresponding confidence scores, the control system 102 may output the control signal indicative of instructions to display the identity of the driver and the confidence score associated with the identity. The control signal may be output to a device having the user interface 114, and the user interface 114 may display a representation of a GUI (e.g., a notification for presentation via the GUI) including the identity and confidence score. An example of the representation of the GUI is described below in reference to FIG. 4. In certain embodiments, the control system 102 may output a control signal to display only potential driver identities with confidence scores exceeding a threshold confidence score, such as the threshold confidence score described above, and/or to display the confidence scores exceeding the threshold value. In some embodiments, the representation of the GUI may include an indication of the event in addition to the identity of the driver and/or the confidence score.

In certain embodiments, the control system 102 may make a determination related to insurance based on the driver's identity and/or the confidence score. For example, the control system 102 may determine that the driver is on an insurance policy for the vehicle involved in the traffic accident and, in response, determine that an insurance claim filed in relation to the traffic accident should be covered by the insurance policy. In some embodiments, the control system 102 may determine that the traffic accident should be covered by the insurance policy only if the confidence score is above the threshold confidence score, if there are no other driver identities indicated by the sensor data, and/or if confidence scores associated with the other driver identities do not exceed the threshold confidence score.

In certain embodiments, the event may include a traffic stop. The control system 102 may receive the indication of the traffic stop from a sensor 182 of the sensors 104 that is disposed at a rear of the vehicle 108. The sensor 182 may include a camera configured to capture an image of a traffic officer's vehicle (e.g., a police car) and/or a traffic officer generally behind the vehicle 108, detect lights and/or noises produced by the traffic officer vehicle, and/or detect other indications of a traffic stop. In some embodiments, the sensor 140 and/or the sensor 182 may generally capture images and/or video around the vehicle 108 (e.g., in front the vehicle 108, behind the vehicle 108, to the sides of the vehicle 108), and the control system 102 may determine liability for the traffic accident based on the sensor data received from the sensor 140 and/or the sensor 182. In some embodiments, the black box 110 may collect sensor data indicative of vehicle speed, braking usage, and/or other driving parameters, and the control system 102 may determine liability based on such sensor data.

In response to receiving the indication of the traffic stop, the control system 102 may output a control signal to the sensor 140, the sensor 182, and/or another suitable sensor of the sensors 104 indicative of instructions to record audio and/or video of the traffic stop. The sensors 140 and/or 182 may record the traffic stop and provide the recording for display via the user interface 114. In some embodiments, the control system 102 may output the recording to an insurance provider associated with the vehicle 108 and/or the driver.

In certain embodiments, the control system 102 may determine an adjustment to an insurance cost (e.g., insurance premium, insurance deductible) associated with the vehicle based on the traffic accident or the traffic stop. For example, the control system 102 may determine an increase to the insurance cost for each traffic stop or traffic accident associated with the vehicle and/or the driver. Additionally, the control system 102 may determine a decrease to the insurance cost when there is not a traffic stop or traffic accident associated with the vehicle and/or the driver for a particular period of time (e.g., one month, one year, two years, ten years). In some embodiments, only traffic accidents in which the driver was liable may affect the insurance cost.

In certain embodiments, the control system 102 may enable a user (e.g., an owner and/or driver of the vehicle 108) to select certain variables that may be monitored by the control system 102 via the sensors 104. For example, the sensors 104 may collect sensor data indicative of the variables and provide the sensor data to the control system 102. Examples of such variables may include vehicle speed, braking usage, data indicative of distracted driving (e.g., cell phone usage, car electronic usage), a time of day that the vehicle is driven (e.g., nighttime, daytime), an extent of a time period during which the vehicle is driven, parking locations of the vehicle (e.g., in a garage, in a driveway, on a street, in a particular neighborhood), and other suitable monitor variables.

In certain embodiments, the control system 102 may collect the sensor data indicative of monitor variables and determine a recommendation for one or more of monitor variables that may improve a driving efficiency of the driver and/or the vehicle and/or that may reduce a likelihood of a traffic accident. For example, the control system 102 may determine that decreasing an average speed of the vehicle may increase gas mileage, decrease wear on the vehicle, and/or decrease a likelihood of a traffic accident involving the vehicle. The control system 102 may output a control signal indicative of instructions to display the monitor variables available for selection by the user and one or more recommendations for the monitor variables. An example of a representation of a GUI indicating available monitor variables, recommendations, and selectable options enabling a user to select some or all of the monitor variables is described below in reference to FIG. 5.

In response to the user selecting certain monitor variables, the control system 102 may monitor the variables and provide incentives (e.g., rewards) for the user following recommendations related to the variables or otherwise improving the variables. By way of example, if the user selects vehicle speed, the control system 102 may determine that the user drives at excessive speeds on a freeway during the user's morning commute and may recommend that the user decrease their average speed on the freeway. Additionally, the control system 102 may offer an incentive of a reduced insurance cost (e.g., insurance premium, insurance deductible) for reducing the average vehicle speed. Thereafter, the control system 102 may monitor the vehicle speed and determine whether the user has followed the recommendation.

In certain embodiments, the control system 102 may determine the identity of the driver based on data indicative of the monitor variables. For example, the data may indicate certain driving habits of the driver (e.g., grip on a steering wheel, pedal positions, average speed, commuting routes), and the control system 102 may determine the identity of the driver based on the driving habits, (e.g., over a time period, such as a time period prior to the vent, a time period prior to approaching the location 106, and/or while approaching the location 106) such as in place of or in addition to the other indications of the driver's identity described herein.

Figure 2:
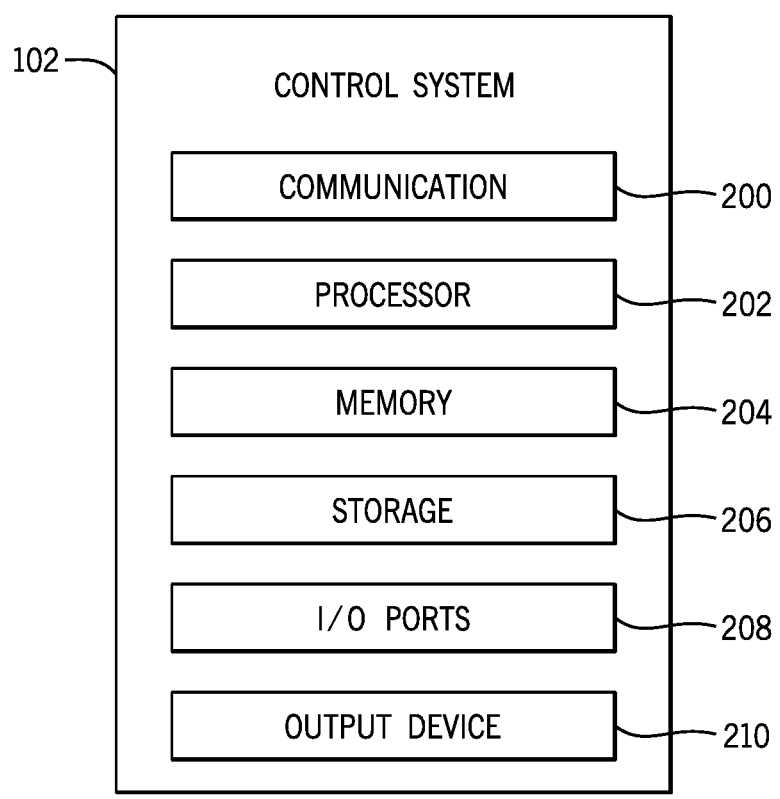
FIG. 2 illustrates a block diagram of components that may be part of the control system of FIG. 1, in accordance with embodiments described herein.

The control system 102 may include certain components to facilitate these actions. FIG. 2 illustrates a block diagram of components that may be part of the control system 102 of FIG. 1. For example, the control system 102 may include a communication component 200, a processor 202, a memory 204, a storage 206, input/output (I/O) ports 208, an output device 210 (e.g., a display or a speaker), or any of a variety of other components that enable the control system 102 to carry out the techniques described herein. The communication component 200 may be a wireless or wired communication component that may facilitate communication between the control system 102, various devices within the location 106, the sensors 104, the vehicle 108, devices within the vehicle 108, the user profile database 130, and the user interface 114.

The processor 202 may be any suitable type of computer processor or microprocessor capable of executing computer-executable code. The processor 202 may also include multiple processors that may perform the operations described below. The memory 204 and the storage 206 may be any suitable articles of manufacture that can serve as media to store processor-executable code, data, or the like. These articles of manufacture may represent computer-readable media (e.g., any suitable form of memory or storage) that may store the processor-executable code used by the processor 202 to perform the presently disclosed techniques. The memory 204 and the storage 206 may also be used to store the data, various other software applications, and the like. The memory 204 and the storage 206 may represent non-transitory computer-readable media (e.g., any suitable form of memory or storage) that may store the processor-executable code (e.g., computer readable instructions) used by the processor 202 to perform various techniques described herein. It should be noted that non-transitory merely indicates that the media is tangible and not a signal.

The I/O ports 208 may be interfaces that may couple to other peripheral components such as input devices (e.g., keyboard, mouse), sensors, input/output (I/O) modules, and the like. The output device 210 may operate to depict indications associated with software or executable code processed by the processor 202. In one embodiment, the output device 210 may be an input device. For example, the output device 210 may include a touch display capable of receiving inputs from a user of the control system 102. The output device 210 may be any suitable type of display, such as a liquid crystal display (LCD), plasma display, or an organic light emitting diode (OLED) display, for example. In one embodiment, the output device 210 may depict or otherwise provide the representations of GUIs described herein. In certain embodiments, the output device 210 may be the user interface 114 or may include the user interface 114. It should be noted that the components described above with regard to the control system 102 are exemplary components, and the control system 102 may include additional or fewer components as shown.

Figure 3:
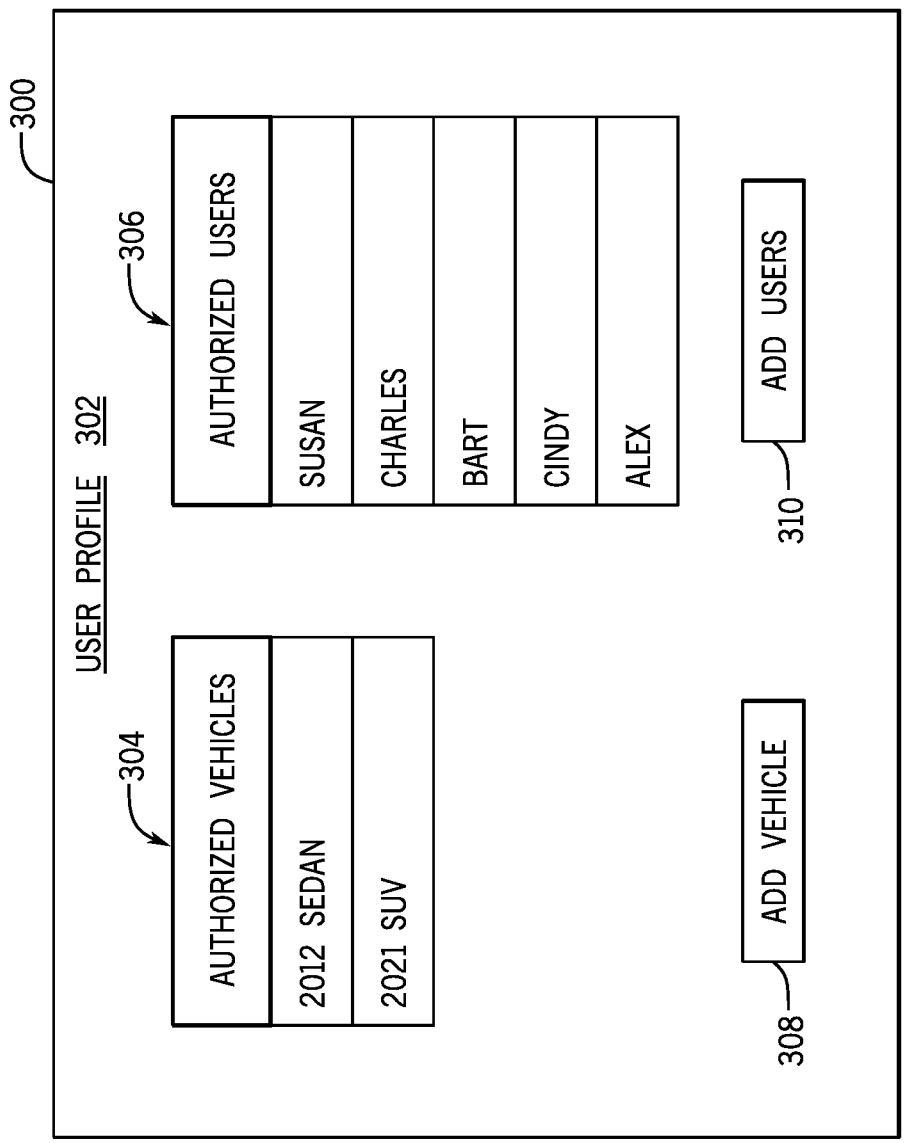
FIG. 3 illustrates a representation of a user interface that may be generated by the user identification system of FIG. 1, wherein the user interface presents indications of vehicles authorized to access a location and indications of users authorized to operate the vehicles, in accordance with embodiments described herein.

With the foregoing in mind, examples of notifications that may be provided by the user identification system 100 are discussed below with reference to FIGS. 3-6. For example, FIG. 3 illustrates a representation 300 of the user interface 114 (e.g., a notification displayed via the user interface 114) that may be generated by the control system 102 of the user identification system 100. In the illustrated embodiment, the representation 300 includes a user profile 302 related to a location, such as the location 106 of FIG. 1. The control system 102 may generate the representation 300 in response to receiving a user request to view and/or modify the user profile 302, such as an input provided to the user interface 114. Additionally, the control system 102 may generate the representation 300 in response to receiving the indication of the vehicle 108 approaching the location 106 and/or in response to other suitable inputs.

As illustrated, the user profile 302 includes a list 304 of vehicles authorized to access the location and a list 306 of users authorized access the location. The list 304 and/or the list 306 may be generated by a user (e.g., owner, occupant, resident) of the location or may be generated by an insurance provider (e.g., a provider of insurance for the home or other property at the location, a provider of insurance for one or more of the vehicles). A record indicative of the user profile 302 may be stored in the user profile database 130, and the control system 102 may retrieve the user profile 302 (e.g., the record indicative of the user profile 302) in response to the request for the user profile 302.

The representation 300 also includes a selectable option 308 (e.g., a button) for adding one or more vehicles to the list 304 and a selectable option 310 (e.g., a button) for adding one or more users to the list 306. A user may select the selectable option 308 to add a vehicle to the list 304 (e.g., an additional vehicle authorized to access the location) and may select the selectable option 310 to add a user to the list 306 (e.g., an additional user authorized to access the location). In certain embodiments, the representation 300 may include options for removing vehicles from the list 304 and/or removing users from the list 306. The control system 102 may receive modifications (e.g., additions, deletions) to the list 304 and/or the list 306 and update the user profile 302 based on the modifications (e.g., update the record indicative of the user profile 302 stored in the user profile database 130). In some embodiments, the list 304, the list 306, the selectable option 308, the selectable option 310, or a combination thereof may be omitted from the representation 300.

Figure 4:
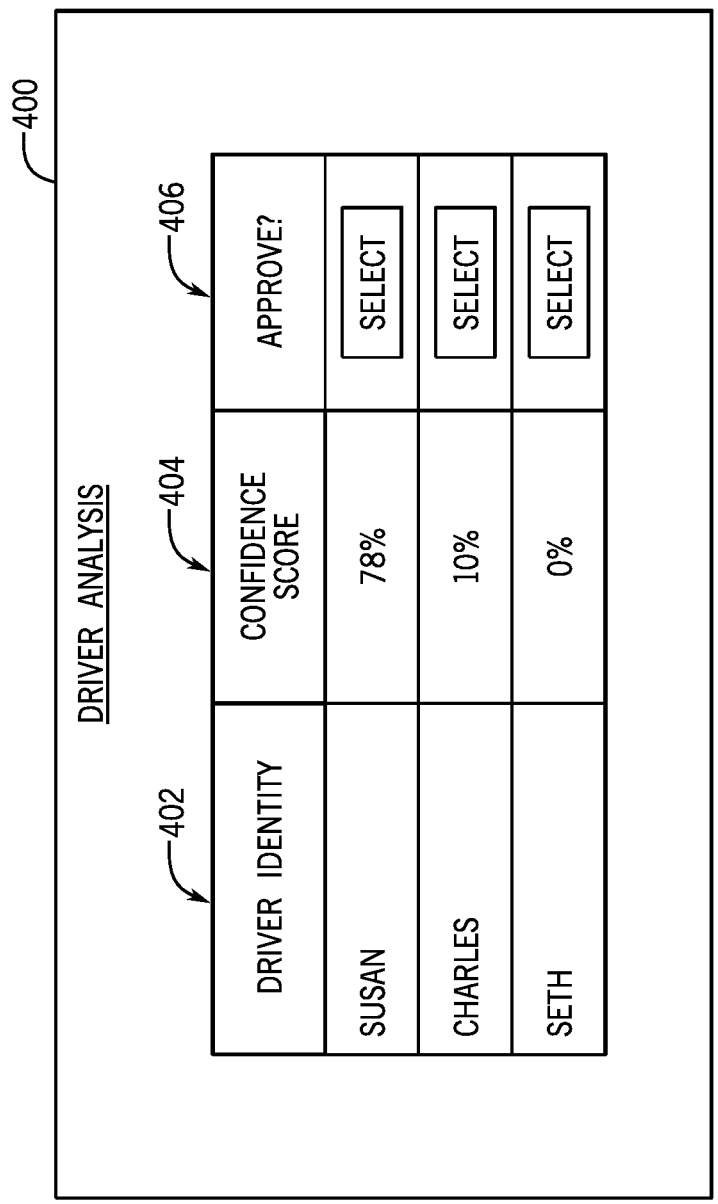
FIG. 4 illustrates a representation of a user interface that may be generated by the user identification system of FIG. 1, wherein the user interface presents indications of a driver's identity and a confidence score associated with each driver identity, in accordance with embodiments described herein.

Additionally, as described above, the control system 102 may determine one or more user identities of a driver of a vehicle and a confidence score associated with each user identity. FIG. 4 illustrates a representation 400 of the user interface 114 including such driver analysis, including a list 402 of driver identities (e.g., potential drivers of the vehicle during an event) and a list 404 of confidence scores associated with the driver identities. Each confidence score of the list 404 may indicate a likelihood that the user indicated by the corresponding user identity of the list 402 was the driver of the vehicle during the event. The representation 400 also includes selectable options 406 for approving a particular person as the driver of the vehicle during the event. For example, a user may view the representation 400 and select one of the selectable options 406 to designate that particular person as the driver during the event. In response to receiving the selection, the control system 102 may store an indication of the selected driver, such as in a record associated with the event. In some embodiments, the control system 102 may output a control signal indicative of instructions to generate and/or display the representation 400, such as via the user interface 114, in response to a request for the user identities and the confidence scores. In certain embodiments, the list 404 and/or the selectable options 406 may be omitted from the representation 300. In some embodiments, the representation 400 may include only driver identities with confidence scores above the threshold confidence score or may only include the driver identity having the highest confidence score.

Figure 5:
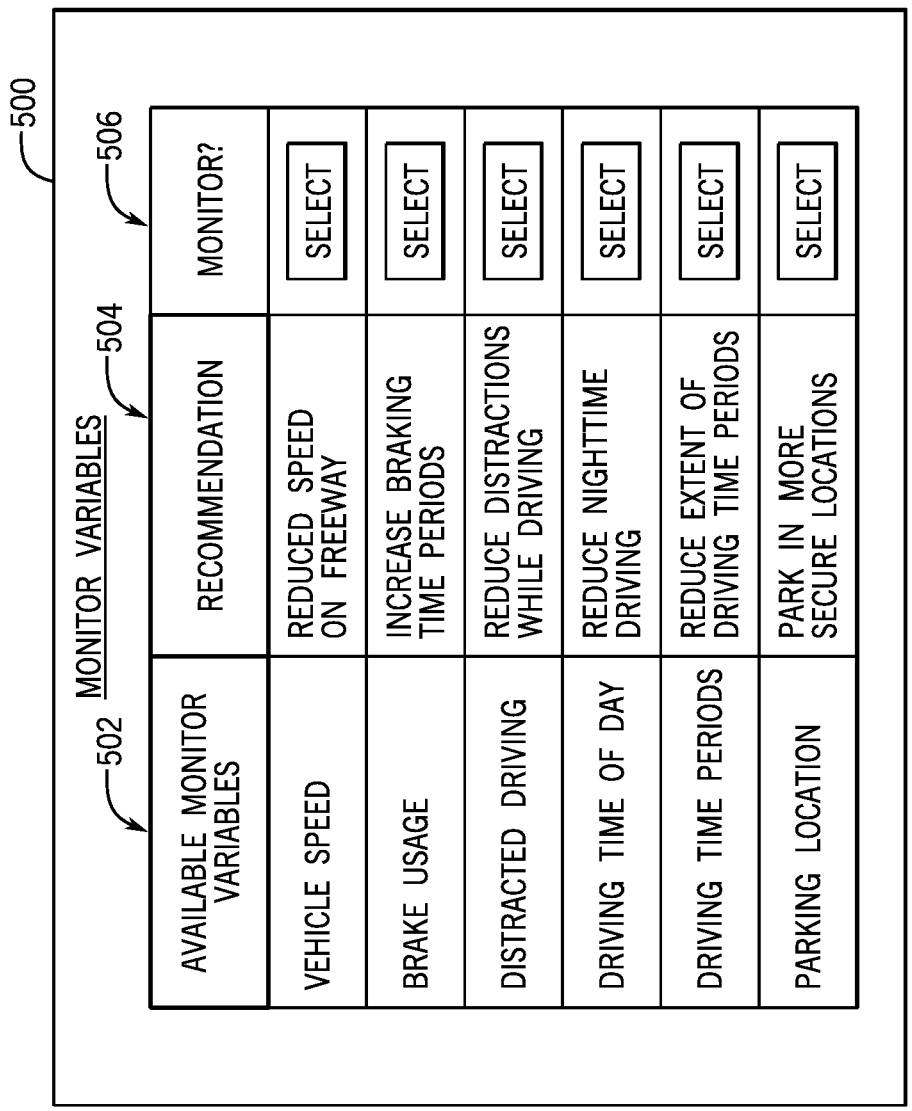
FIG. 5 illustrates a representation of a user interface that may be generated by the user identification system of FIG. 1, wherein the user interface presents monitor variables related to operation of a vehicle and recommendations related to the monitor variables, in accordance with embodiments described herein.

FIG. 5 illustrates a representation 500 of the user interface 114 that presents monitor variables related to operation of a vehicle and recommendations related to the monitor variables. The control system 102 may generate the representation 500 to facilitate viewing and/or selection of the monitor variables by a user. For example, the control system 102 may determine variables available to be monitored and that may be improved (e.g., that may benefit the user). In certain embodiments, the control system 102 may determine the available monitor variables as the variables for which the sensors 104 may provide data. The representation 500 includes a list 502 of the available monitor variables. The list includes vehicle speed, brake usage, driving time of day, and driving time periods, each of which may be detected and/or recorded by the black box 110 and/or another suitable sensor 104. Additionally, the control system 102 may determine distracted driving based on sensors of the sensors 104 at the mobile device 150 (e.g., sensors configured to detect activity at the mobile device 150), based on sensors of the sensors 104 configured to detect activity at electronics of the vehicle 108 (e.g., at a navigation system, at a radio), and/or based on sensors of the sensors 104 configured to detect the vehicle 108 drifting (e.g., drifting into another lane, swerving). In some embodiments, the sensors 104 may include a location sensor (e.g., position sensor, GPS) at the vehicle 108 and configured to detect the vehicle's location, and the control system 102 may monitor the location to determine where the vehicle 108 is typically parked and/or driven.

Additionally, for each monitor variable, the control system 102 may determine a recommendation for improving the monitor variable from the perspective of the user and/or from the perspective of another party (e.g., an insurance provider for the user's vehicle). For example, the improvements to the monitor variables may improve a driving efficiency of the driver and/or the vehicle 108 and/or may reduce a likelihood of a traffic accident involving the vehicle 108. The representation 500 includes a list 504 of recommendations for each available monitor variable. The representation 500 also includes selectable options 506 that enable the user to select certain monitor variables for monitoring by the control system 102. In response to receiving one or more selections via the selectable options 506, the control system 102 may monitor the corresponding variables. In some embodiments, the control system 102 may output a control signal to one or more of the sensors 104 indicative of instructions to collect and/or provide data for the selected monitor variables in response to receiving the user selections.

As described above, the control system 102 may determine the identity of the driver based on data indicative of the monitor variables. For example, the data may indicate certain driving habits of the driver (e.g., average speed, commuting routes), and the control system 102 may determine the identity of the driver based on the driving habits, such as in place of or in addition to the other indications of the driver's identity described herein.

In certain embodiments, the control system 102 may offer incentives for selection of the monitor variables, for following the recommendations related to the monitor variables, and/or for improvements to the monitor variables. For example, the control system 102 may offer financial incentives to the user, such as a decrease to an insurance cost associated with the vehicle 108. The control system 102 may determine an effect (e.g., a decrease or increase) on the insurance cost for each change to the monitor variable and determine the incentive to be offered based on the effect on the insurance cost. In some embodiments, the representation 500 may present the incentives to the user, thereby enabling the user to view the incentives for consideration while selecting the variables to monitor. In response to receiving the selection of the monitor variables, the user following the recommendations related to the monitor variables, and/or determining the improvements to the monitor variables, the control system 102 may determine that the incentives are applicable and implement the incentives. For example, in response to determining that the user has reduced the average speed of the vehicle 108 on the freeway, the control system 102 may determine an adjustment to the insurance cost and store an indication of the adjustment in a user profile associated with the user and/or the vehicle 108 (e.g., a user profile stored in the user profile database 130). In certain embodiments, the list 504 and/or the selectable options 506 may be omitted from the representation 500.

Figure 6:
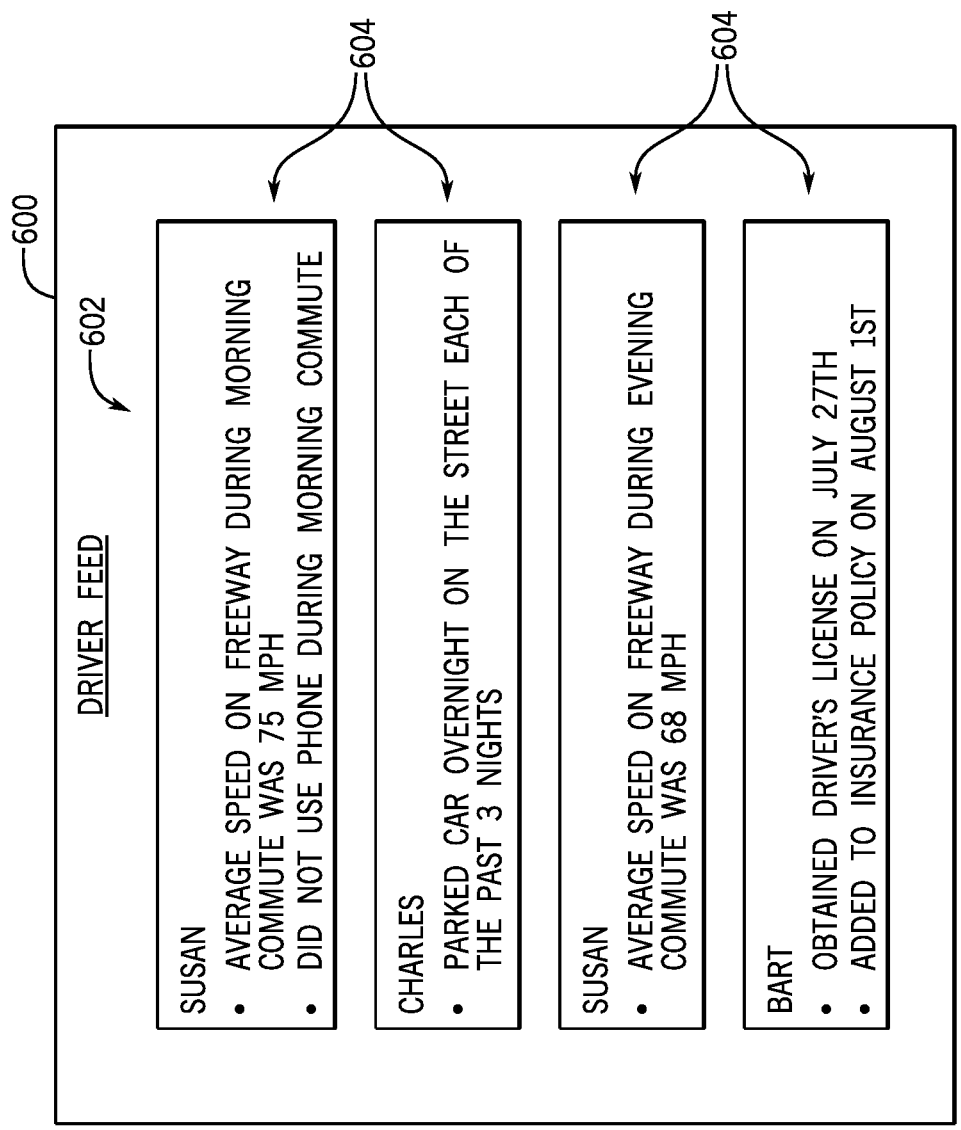
FIG. 6 illustrates a representation of a user interface that may be generated by the user identification system of FIG. 1, wherein the user interface presents a feed of information related to vehicle activity, in accordance with embodiments described herein.

FIG. 6 illustrates a representation 600 of the user interface 114 that presents a feed 602 of information related to activity of the vehicle 108. The control system 102 may generate the representation 600 to facilitate viewing of driver activity by one or more interested parties. For example, the feed 602 includes activity items 604 indicating activity of certain drivers. The control system 102 may determine the drivers to be displayed via the feed 602 and/or the activity of the drivers to be included in the activity items 604 based on a user profile associated with one or more of the drivers and/or one or more vehicles, such as a user profile stored in the user profile database 130. The interested parties may include the drivers listed in the feed 602, other drivers listed on the user profile, an insurance provider for the vehicle 108, and/or other suitable parties. Accordingly, the representation 600 may present the feed 602 to the interested parties to facilitate communication regarding the driver activity.

Figure 7:
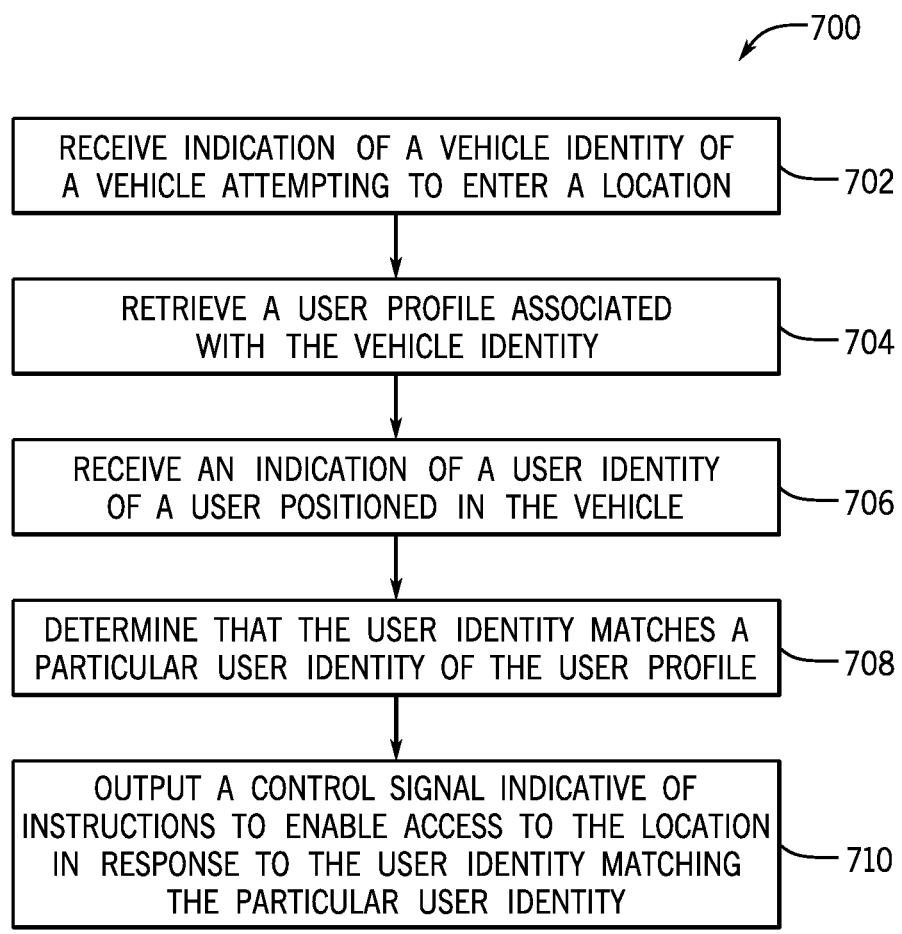
FIG. 7 illustrates a flow chart of a method for identifying a vehicle and a user in the vehicle and enabling the vehicle to access a location using the user identification system of FIG. 1, in accordance with embodiments described herein.

FIG. 7 illustrates a flow chart of a method 700 for enabling the vehicle 108 to access the location 106 based on a vehicle identity of the vehicle 108 and/or a user identity of one or more of the users 112 in the vehicle 108 using the control system 102 of FIG. 1. The following description of the method 700 will be described as being performed by the control system 102, but it should be noted that any suitable processor-based device may be specially programmed to perform any of the methods described herein. Moreover, although the following description of the method 700 is described as including certain steps performed in a particular order, it should be understood that the steps of the method 700 may be performed in any suitable order, that certain steps may be omitted, and/or that certain steps may be added.

At block 702, the control system 102 may receive an indication of a vehicle identity of the vehicle 108 attempting to enter the location 106 (e.g., a vehicle at an entrance of the location 106). For example, the control system 102 may receive the indication of the vehicle identity from one or more of the sensors 104, such as the sensor 120. In certain embodiments, the indication may include an image of the vehicle 108, and the control system 102 may determine a portion of the image that uniquely identifies the vehicle 108, such as a portion of the image that shows the license plate 122 or the VIN 124. Accordingly, the control system 102 may determine the vehicle identity of the vehicle 108 based on the sensor data received from the sensors 104.

At block 704, the control system 102 may retrieve a user profile associated with the vehicle identity of the vehicle 108, such as from the user profile database 130. The user profile may indicate user identities of users associated with the vehicle 108 and/or authorized to access the location 106. For example, the user profile may be generated by a user (e.g., owner, occupant, resident) of the location 106, and the user may identify themselves and/or other users that are authorized to access the location 106.

At block 706, the control system 102 may receive an indication of a user identity (e.g., a current user identity) of a user (e.g., a current user) positioned in the vehicle 108, such as one or more of the users 112. The indications of the user identity may include an image of the user, audio data of the user's voice and/or other noises made by the user, a seat position of the user's seat, a weight of the user, pedal positions of pedals of the vehicle 108, and/or other suitable indications of the user's identity provided by the sensors 104. The control system 102 may determine the user identity based on sensor data from a single sensor 104, such an image captured by the sensor 140, or based on sensor data from multiple sensors 104, such the image captured by the sensor 140 and the weight of the user captured by the sensor 142.

At block 708, the control system 102 may determine that the user identity of the user in the vehicle 108 matches or corresponds to a particular user identity of the user profile. For example, the control system 102 may compare the user identity to the user identities of the user profile and determine that a name and/or other identifying feature of the user identity matches or corresponds to at least one user identity of the user profile.

At block 710, the control system 102 may output a control signal indicative of instructions to enable the vehicle 108 to access the location 106 in response to the user identity of the user in the vehicle 108 matching the particular user identity of the user profile. For example, the control system 102 may output a control signal to the garage door 172 indicative of instructions to open. In response to the user identity not matching a user identity of the user profile, the control system 102 may block access to the location 106, such as by not opening the garage door 172 and/or by implementing another measure configured to block access to the location 106. In this way, the control system 102 may provide a multi-factor authentication (e.g., two-factor authentication; both vehicle authentication and user authentication) process to provide access to the location 106.

Figure 8:
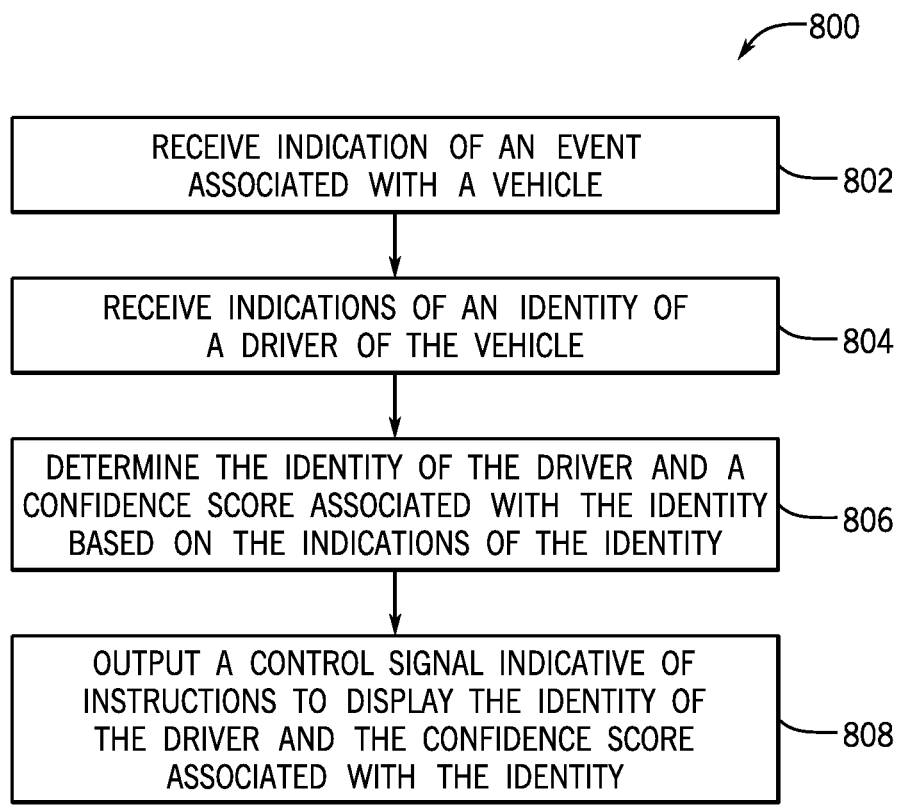
FIG. 8 illustrates a flow chart of a method for identifying a driver of a vehicle using the user identification system of FIG. 1, in accordance with embodiments described herein.

FIG. 8 illustrates a flow chart of a method 800 for determining an identity of a driver of a vehicle using the control system 102 of FIG. 1. The following description of the method 800 will be described as being performed by the control system 102, but it should be noted that any suitable processor-based device may be specially programmed to perform any of the methods described herein. Moreover, although the following description of the method 800 is described as including certain steps performed in a particular order, it should be understood that the steps of the method 800 may be performed in any suitable order, that certain steps may be omitted, and/or that certain steps may be added.

At block 802, the control system 102 may receive an indication of an event associated with the vehicle 108. For example, the event may include the vehicle 108 approaching the location 106, a traffic accident involving the vehicle 108, a traffic stop involving the vehicle 108, and/or another suitable event. The control system 102 may receive the indication of the event from one or more of the sensors 104, such as the sensor 120, a collision sensor at the vehicle 108, and/other another suitable sensor 104.

At block 804, the control system 102 may receive indications of an identity of the driver 160 of the vehicle 108. The indications of the driver's identity may be different from one another and may include an image of the driver 160, audio data of the driver's voice and/or other noises made by the driver 160, a seat position of the driver's seat 144, positions of pedals of the vehicle 108, a weight of the driver 160, and/or other suitable indications of the driver's identity.

At block 806, the control system 102 may determine the identity of the driver 160 and a confidence score associated with the identity based on the indications of the driver's identity. For example, multiple, different indications of the driver's identity may indicate that the driver 160 is a particular person, and the confidence score may indicate a likelihood that the driver 160 is the particular person. In some embodiments, the indications may indicate that the driver 160 could be different people, and the control system 102 may determine a confidence score for each of the different people.

At block 808, the control system 102 may output a control signal indicative of instructions to display the identity of the driver the confidence score associated with the identity, thereby facilitating identification of the person that is or was driving the vehicle 108 during the event. An example of a representation of a user interface that may present the identity of the driver and the confidence score is illustrated in FIG. 4 and is described above.

Accordingly, the control system of the user identification system described herein may facilitate identifying users in a vehicle to enable or block access by the vehicle into a particular location. Additionally, a driver of the vehicle during an event may be identified to make certain determinations related to the event, such as accident liability and/or insurance coverage. As such, the control system described herein may facilitate and improve identification of the users in the vehicle, thereby improving the users' experiences associated with the vehicle and an experience of a user (e.g., owner, occupant, resident) of the location.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Accordingly, it should be appreciated that features described with reference to FIGS. 1-8 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A user identification system, comprising:
one or more processors configured to:
receive, via communication between a communication component and one or more entrance devices at an entrance of a location, a first indication of a vehicle identity of a vehicle at the entrance of the location;
retrieve a user profile associated with the vehicle identity from a user profile database, wherein the user profile comprises one or more user identities of one or more users authorized to enter the location;
receive, via communication between the communication component and one or more vehicle devices on-board the vehicle, a second indication of a current user identity of a current user positioned in the vehicle, wherein the second indication of the current user identity comprises one or more driving habits of the current user;
determine the current user identity of the current user positioned in the vehicle based on the second indication of the current user identity;
determine that the current user identity corresponds to a particular user identity of the one or more user identities; and
output a control signal indicative of instructions to enable access to the location in response to the current user identity corresponding to the particular user identity.

2. The user identification system of claim 1, wherein the first indication of the vehicle identity comprises a first image of a license plate of the vehicle, a second image of a vehicle identification number (VIN) of the vehicle, or both.

3. The user identification system of claim 2, comprising a camera configured to:
capture the first image, the second image, or both; and
provide the first image, the second image, or both, to the one or more processors.

4. The user identification system of claim 1, wherein the location comprises a residence of the current user, and wherein the one or more processors are configured to output the control signal indicative of instructions to open a garage door to enable access to the location.

5. The user identification system of claim 1, wherein the second indication of the current user identity comprises an image of the current user, audio data indicative of a voice of the current user, a weight of the current user, a position of a seat of the vehicle at which the current user is positioned, biometric data of the current user, or a combination thereof.

6. The user identification system of claim 5, comprising one or more sensors disposed at the vehicle, wherein the one or more sensors are configured to capture the image of the current user, capture the audio data, weigh the current user, detect the position of the seat of the vehicle, capture the one or more driving habits of the current user, capture the biometric data of the current user, or a combination thereof.

7. The user identification system of claim 1, wherein the one or more processors are configured to:
output an additional control signal indicative of instructions to provide a user interface configured to display a first list of one or more vehicles authorized to access the location, display a second list of the one or more users authorized to access the location, or both; and
receive, via the user interface, a first input indicative of a particular vehicle to add or remove from the first list, a second input indicative of a particular user to add or remove from the second list, or both.

8. The user identification system of claim 1, wherein the one or more processors are configured to output an additional control signal to one or more sensors indicative of instructions to obtain the second indication of the current user identity of the current user in response to receiving the first indication of the vehicle identity of the vehicle.

9. A user identification system comprising:
one or more processors configured to:
  receive, via communication between a communication component and one or more vehicle devices, an indication of an event associated with a vehicle, wherein a driver is positioned in the vehicle during the event, and wherein the one or more vehicle devices are on-board the vehicle;
  in response to the indication of the event, request a plurality of indications of an identity of the driver of the vehicle from the one or more vehicle devices;
  receive, via communication between the communication component and the one or more vehicle devices, the plurality of indications of the identity of the driver of the vehicle, wherein a first indication of the plurality of indications of the identity of the driver comprises one or more driving habits of the driver during a period prior to the event;
  determine the identity of the driver and a confidence score associated with the identity based on the plurality of indications of the identity; and
  output a control signal indicative of instructions to display the identity of the driver and the confidence score associated with the identity.

10. The user identification system of claim 9, wherein the plurality of indications of the identity of the driver comprise an image of the driver, audio data indicative of a voice of the driver, a weight of the driver, a position of a seat of the vehicle at which the driver is positioned, and biometric data of the driver.

11. The user identification system of claim 10, comprising one or more sensors disposed at the vehicle, wherein the one or more sensors are configured to capture the image of the driver, capture the audio data, weigh the driver, detect the position of the seat of the vehicle, capture a fingerprint of the driver, or a combination thereof.

12. The user identification system of claim 9, wherein the one or more processors are configured to output the control signal in response to the confidence score exceeding a threshold value.

13. The user identification system of claim 9, wherein the indication of the event comprises an indication of a traffic stop, and wherein the one or more processors are configured to:
  output an additional control signal to a camera disposed at the vehicle indicative of instructions to record imagery in response to receiving the indication of the traffic stop;
  output a further control signal to an audio recorder disposed at the vehicle indicative of instructions to record audio in response to receiving the indication of the traffic stop; or
  both.

14. The user identification system of claim 9, wherein the one or more processors are configured to determine an adjustment to an insurance cost associated with the vehicle based on the identity of the driver and the confidence score.

15. The user identification system of claim 9, wherein the one or more processors are configured to:
  retrieve a user profile associated with the vehicle from a user profile database, wherein the user profile indicates one or more users associated with the vehicle; and
  output an additional control signal to a device associated with each user of the one or more users, wherein the additional control signal is indicative of instructions to display a notification indicating the event, the identity of the driver, the confidence score, or a combination thereof.

16. The user identification system of claim 9, wherein the one or more processors are configured to:
  receive sensor data from one or more sensors disposed at the vehicle, wherein the sensor data is indicative of one or more variables associated with operation of the vehicle;
  determine an effect on an insurance cost associated with the vehicle based on a change to the one or more variables; and
  output an additional control signal indicative of instructions to display the effect on the insurance cost and the one or more variables.

17. The user identification system of claim 16, wherein the additional control signal is output to a device configured to display a graphical user interface (GUI), wherein the GUI is configured for selection of at least one variable of the one or more variables, and wherein the one or more processors are configured to:
  receive an indication of a selection of the at least one variable from the device; and
  output a further control signal to the one or more sensors indicative of instructions to provide additional sensor data indicative of the at least one variable.

18. A non-transitory computer-readable medium comprising computer readable instructions, that when executed by one or more processors, causes the one or more processors to perform operations comprising:
  receiving, via communication between a communication component and one or more entrance devices at an entrance of a location, a first indication of a vehicle identity of a vehicle at the entrance of the location;
  retrieving a user profile associated with the vehicle identity from a user profile database, wherein the user profile comprises one or more user identities of one or more users authorized to enter the location;
  receiving, via communication between the communication component and one or more vehicle devices on-board the vehicle, a second indication of a current user identity of a current user positioned in the vehicle, wherein the second indication of the current user identity comprises one or more driving habits of the current user;
  determining the current user identity of the current user positioned in the vehicle based on the second indication of the current user identity;
  determining that the current user identity corresponds to a particular user identity of the one or more user identities; and
  outputting a control signal indicative of instructions to enable access to the location in response to the current user identity corresponding to the particular user identity.

19. The non-transitory computer-readable medium of claim 18, wherein the second indication of the current user identity comprises an image of the current user, audio data indicative of a voice of the current user, a weight of the current user, a position of a seat of the vehicle at which the current user is positioned, biometric data of the current user, or a combination thereof.

20. The user identification system of claim 1, wherein the one or more driving habits of the current user comprise a grip on a steering wheel of the vehicle, a position of a pedal in the vehicle, an average speed of the vehicle, a route of the vehicle, or any combination thereof.

\* \* \* \* \*